United States Patent
Idnani

(10) Patent No.: US 7,499,720 B2
(45) Date of Patent: Mar. 3, 2009

(54) SYSTEM AND METHOD FOR INITIATING PUSH-TO-TALK SESSIONS BETWEEN OUTSIDE SERVICES AND USER EQUIPMENT

(75) Inventor: Amit Idnani, Santa Clara, CA (US)

(73) Assignee: Sonim Technologies, Inc., San Mateo, CA (US)

(*) Notice: Subject to any disclaimer, the term of this patent is extended or adjusted under 35 U.S.C. 154(b) by 104 days.

(21) Appl. No.: 11/601,117

(22) Filed: Nov. 16, 2006

(65) Prior Publication Data
US 2007/0142073 A1 Jun. 21, 2007

Related U.S. Application Data

(63) Continuation of application No. 11/022,273, filed on Dec. 24, 2004, now Pat. No. 7,155,248.

(60) Provisional application No. 60/621,159, filed on Oct. 22, 2004.

(51) Int. Cl.
*H04Q 7/20* (2006.01)
*H04L 12/58* (2006.01)
*H04M 3/42* (2006.01)

(52) U.S. Cl. .................... 455/519; 455/416; 455/412.1

(58) Field of Classification Search ................ 455/517, 455/518, 519, 520, 521, 416
See application file for complete search history.

(56) References Cited

U.S. PATENT DOCUMENTS

| 7,107,017 | B2* | 9/2006 | Koskelainen et al. | 455/90.2 |
| 7,415,284 | B2* | 8/2008 | Hoover et al. | 455/518 |
| 2004/0190468 | A1* | 9/2004 | Saijonmaa | 370/312 |
| 2005/0105511 | A1* | 5/2005 | Poikselka | 370/352 |

* cited by examiner

*Primary Examiner*—Tilahun B Gesesse
(74) *Attorney, Agent, or Firm*—Kali Law Group, P.C.

(57) ABSTRACT

Methods of establishing a push-to-talk (PTT) session between a user equipment that is part of a push-to-talk over cellular (PoC) system and an outside service are presented including: subscribing to an outside service by the user equipment; for a user initiated request, sending a request to establish the PTT session with the outside service by the user equipment to a service capability server (SCS), the SCS configured to communicate with the outside service; for an outside service initiated request, sending a request to establish the PTT session with the user equipment by the outside service to the SCS the SCS further configured to communicate with the user equipment; sending an invitation to initiate the PTT session between the user equipment and the outside service by the SCS to the PoC system; and establishing the PTT session between the user equipment and the outside service by the PoC system.

42 Claims, 9 Drawing Sheets

SYSTEM AND METHOD FOR INITIATING PUSH-TO-TALK SESSIONS BETWEEN OUTSIDE SERVICES AND USER EQUIPMENT

RELATED APPLICATIONS

This application is a continuation of U.S. patent application Ser. No. 11/022,273 filed on Dec. 12, 2004 which application claims priority to U.S. Provisional Application No. 60/621,159, filed on Oct. 22, 2004.

FIELD

The present invention relates in general to cellular communication technologies and in particular to a method and system connecting outside web services to user equipment through push-to-talk sessions.

BACKGROUND

Mobile cellular communication is evolving beyond traditional voice telephony towards more sophisticated services, such as Push-To-Talk (PTT). Similar to conventional walkie-talkie communication, PTT enables mobile communication users to send a voice message to one or more recipients over a mobile phone by simply pushing a key (i.e., PTT button, etc.).

One particular version of PTT, called PoC (PTT-over-Cellular), has started to be implemented in wireless data networks such as GSM/GPRS and CDMA cellular networks. By using internet protocols (i.e., an internet protocol network), these networks can provide a packet-based data service that enables information to be sent and received across a mobile telephone network. In addition, the use of internet protocols also facilitates PoC through the use of instant connections. That is, information can be sent or received immediately as the need arises, subject to available time slots at the air interface.

PTT, including PoC-based PTT, is half-duplex. That is, all participants typically use a single frequency or channel for both transmission and reception. Either a participant speaks or listens, but not both. This is in contrast to traditional cellular communication that is full-duplex (e.g., like a regular wired phone), in which at least one channel or frequency is assigned to talk, and another separate one is assigned to listen such that both speaking and listening can occur simultaneously.

For audio/video data transmissions, PoC applications require the transmission of signaling packets using a signaling protocol, e.g., SIP (Session Initiation Protocol), and data packets using a data protocol, e.g., RTP (Real Time Protocol). SIP is a signaling protocol for Internet conferencing, telephony, presence, events notification, and instant messaging. RTP is an Internet-standard protocol for the transport of real-time data, including audio and video media. It can be used for media-on-demand as well as interactive services such as Internet telephony. RTP consists of a data and a control part. The latter is called RTCP.

PoC is discussed in greater detail in the following technical specifications which are incorporated by reference: Push-to-talk over Cellular (PoC), Architecture, PoC Release 2.0, V2.0.8 (2004-06); Push-to-talk over Cellular (PoC), Signaling Flows—UE to Network Interface (UNI), PoC Release 2.0, V2.0.6 (2004-06); and Push-to-talk over Cellular (PoC) User Plane, Transport Protocols, PoC Release 2.0, V2.0.8 (2004-06). Of note, Release 1.0 is also available from the PoC Consortium as well as an upcoming PoC standard from Open Mobile Alliance (OMA). All of these are generally considered native PoC standards. Subsequently, UE (user equipment), such as a PoC enabled cellular phone, supporting either of these standards is called a native PoC client. Additional information is found in IETF RFC 3261, which is incorporated herein by reference. This document describes Session Initiation Protocol (SIP), which is an application-layer control (signaling) protocol for creating, modifying, and terminating sessions with one or more participants. These sessions include Internet telephone calls, multimedia distribution, and multimedia conferences.

SUMMARY

The present invention advantageously provides on a wireless network, such as a cellular network, Outside Services such as traffic reports, meeting reminders, wake-up calls, and other such notifications by utilizing push-to-talk sessions. The pertinent information is sent to users over the PTT.

As such, methods of establishing a push-to-talk (PTT) session between a user equipment that is part of a push-to-talk over cellular (PoC) system and an outside service are presented including: subscribing to an outside service by the user equipment; for a user initiated request, sending a request to establish the PTT session with the outside service by the user equipment to a service capability server (SCS), the SCS configured to communicate with the outside service; for an outside service initiated request, sending a request to establish the PTT session with the user equipment by the outside service to the SCS the SCS further configured to communicate with the user equipment; sending an invitation to initiate the PTT session between the user equipment and the outside service by the SCS to the PoC system; and establishing the PTT session between the user equipment and the outside service by the PoC system. In some embodiments, methods further include: after the establishing the PTT session, sending a request to join the PTT session by the SCS to at least one additional user; and joining the at least one additional user equipment with the PTT session. In some embodiments, methods are provided where the user equipment is configured to communicate with the PoC system over an internet multimedia subsystem (IMS) core, wherein the IMS core is configured to provide SIP signaling between the user equipment and the PoC system.

In other embodiments, methods of establishing a user initiated push-to-talk (PTT) session between a user equipment that is part of a push-to-talk over cellular (PoC) system and an outside service are presented including: requesting the outside service by the user equipment to an outside service application server; sending a subscription message to indicate readiness to utilize the outside service by the user equipment to the SCS; sending pre-session data to the SCS by the outside service in response to the SUBSCRIBE message; sending an invitation message by the SCS to the PoC system in accordance with the pre-session data; and establishing the PTT session between the user equipment and the outside service by the PoC system. In some embodiments, methods further include: after the establishing the PTT session, sending a request to join the PTT session by the SCS to at least one additional user; and joining the at least one additional user equipment with the PTT session. In some embodiments methods are provided where the SCS includes: a subscription engine for subscribing the user equipment with the outside service; a PoC service initiator for initiating a PTT session on the PoC system; an application program interface (API) for providing communication between the SCS and an outside service application server that provides the outside service; and a media gateway for moving media from the outside service application server to the user equipment.

In other embodiments, methods of establishing an outside service initiated push-to-talk (PTT) session between a user equipment that is part of a push-to-talk over cellular (PoC) system and an outside service are presented including: requesting the outside service by the user equipment to an outside service application server; sending a subscription message to indicate readiness to provide the outside service for the user equipment by the outside service to the SCS; sending pre-session data to the SCS by the outside service; sending an invitation message by the SCS to the PoC system in accordance with the pre-session data; and establishing the PTT session between the user equipment and the outside service by the PoC system. In some embodiments, methods further include: after the establishing the PTT session, sending a request to join the PTT session by the SCS to at least one additional user; and joining the at least one additional user equipment with the PTT session. In some embodiments, methods are provided where the SCS includes: a subscription engine for subscribing the user equipment with the outside service; a PoC service initiator for initiating a PTT session on the PoC system; an application program interface (API) for providing communication between the SCS and an outside service application server that provides the outside service; and a media gateway for moving media from the outside service application server to the user equipment.

In other embodiments, service capability server (SCS) in communication with a push-to-talk network, the SCS configured to establish a push-to-talk (PTT) session with a user equipment, the SCS is presented including: a means for subscribing the user equipment with an outside service application server; and a means for initiating the PTT session on the PTT network, wherein in response to a message requesting to establish the PTT session at a predetermined time received by the means for subscribing, the means for subscribing makes a request to the means for initiating to initiate the PTT session, and wherein in response to the request, the means for initiating causes the PTT network to establish the PTT session. In some embodiments, the SCS further includes: a means for sending a request to at least one additional user equipment to join the PTT session by the SCS after the PTT session is established; and a means for joining the at least one additional user equipment with the PTT session.

DESCRIPTION OF THE DRAWINGS

The foregoing and other features, aspects, and advantages will become more apparent from the following detailed description when read in conjunction with the following drawings, wherein.

DETAILED DESCRIPTION

Figure 1:
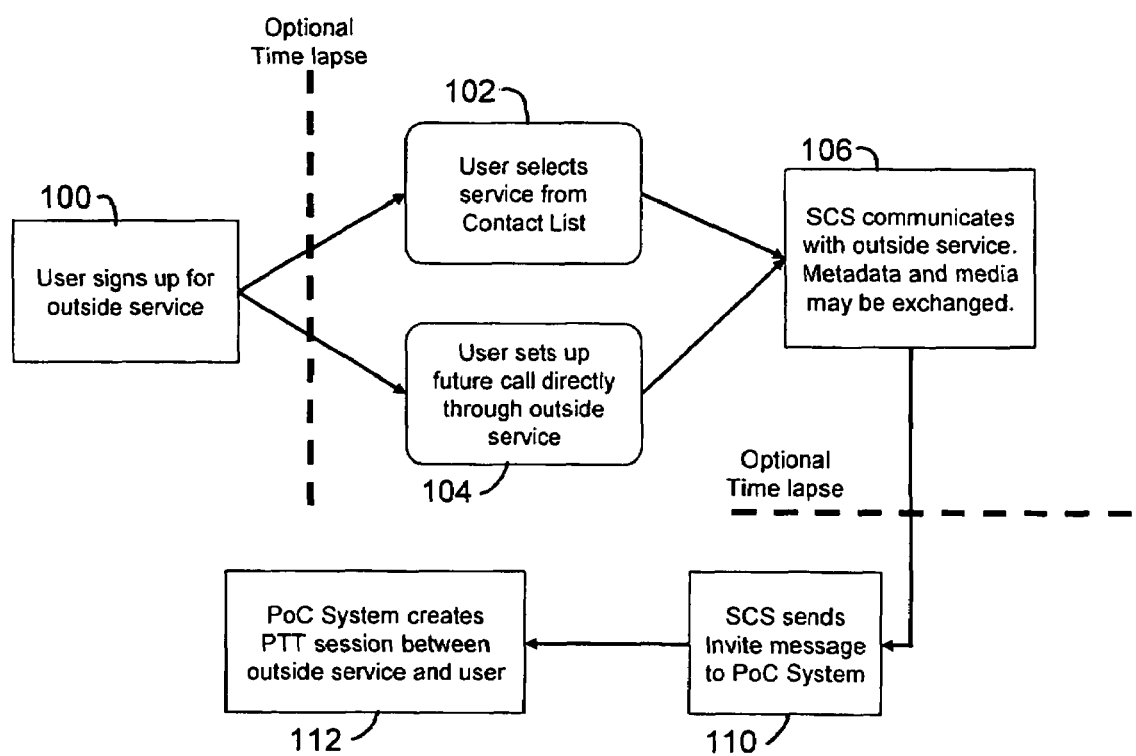
FIG. 1 is a flow chart of the overall process flow in the preferred embodiment of the invention for a user signing up for an outside service and then initiating a PTT session with the service.

The invention is described with reference to specific architectures and protocols. Those skilled in the art will recognize that the description is for illustration and to provide the best mode of practicing the invention. The description is not meant to be limiting. For example, reference is made to SIP and RTP Protocol but other protocols can be used in the invention. Likewise, reference is made to PoC applications, while other types of PTT can be used in the invention.

A. Overview

PoC may be implemented over a variety of access networks, including GPRS according to 3GPP Release 97/98, EGPRS according to 3GPP Release 99 or later releases, and UMTS according to Release 99 or later releases. Many PTT implementations, including the PoC based PTT implementation, also provide contact list functionality. A contact list typically contains the identifiers of other users or groups such that an end user may initiate a PTT call by selecting one or more entries from the list. An entry in a contact list is a contact, e.g. the identity of a user, or a group representative of multiple users. According to PoC standards, a Contact List contains the names of users and a Group List contains predefined groups of users. Generally, a contact is uniquely identified via a SIP URI (Session Initiation Protocol Universal Resource Identifier).

The PTT operator (e.g., Cingular, AWS, etc.) generally assigns to each user, an address-of-record (also known as public user identity) in the form of a SIP URI comprising a user name portion and a domain portion. In general, the username portion of the SIP URI uniquely identifies the user within a given namespace or network. Likewise, the domain part of the SIP URI uniquely identifies a domain owned by the operator. For example, "sip:joe.doe@operator.net" in which "joe.doe" is the username portion of the SIP URI and "operator.net" is the domain portion of the SIP URI. Additional information may also be associated with a contact to facilitate interaction with the contact list, for example, a display name, which for the exemplary SIP URI above could be "Doe, Joe" or "Joe Doe."

The system 10 of the preferred embodiment of the invention includes Service Capability Server (SCS) 12 that utilizes the SIP URI concept in order to communicate with outside services 14. This SIP URI can be mapped to another identifier, such as an email address, that is utilized by the outside service. The SCS 12 also receives metadata from the outside service 14, such as the proper time to start the PTT session or the port where the connection is made or who else besides the user is included in a meeting reminder. In the case of a wake-up call, the SIP URI for the wake-up call action is listed as a "contact" in the user's contact list. The metadata for the wake-up call contains information such as when the call should come in, what content (radio station, MP3, alarm sound, etc.) should be played over the PTT session, how long the session should last, etc. The metadata is essentially whatever user preferences the outside service 14 uses to provide information to a particular user. The process carried out by system 10 assumes that the user has already set up his/her account data and preferences with the outside service 14 and added the outside service 14 as a contact in his/her contact list associated with UE 16.

FIG. 1 depicts an overview of the process carried out by system 10. This high-level flow chart depicts the interaction between the four primary actors: the user with UE 16, the SCS 12, the outside service 14, and the PoC system 18. As discussed in detail later with respect to FIG. 2, the PoC system 18 includes PoC server 20 and Internet Multimedia Subsystem (IMS) core 22.

As depicted in FIG. 1, in step 100 a user signs up for an outside service 14 using UE 16 or other mechanism such as a computer capable of communicating with the desired outside service 14 over a network or the Internet. If the outside service 14 is a UE initiated type of service (e.g., wake-up call service), as a result of the sign up, the SIP URI of the outside service 14 will be placed in the contact list of the UE 16. The UE initiated process is depicted in detail later in this specification with respect to FIG. 4. If the outside service 14 is a server-initiated type of service, no entry is required in the contact list (unless the outside service 14 is also a UE initiated type of service). The outside service-initiated process is depicted in detail later in this specification with respect to FIG. 5.

A combination of a UE initiated PTT session and outside service initiated PTT session is also possible. For example, through UE 16 the user may request traffic updates immediately and periodically over the next hour. UE 16 will initiate the initial PTT session for the present traffic report. Then, periodically over the next hour, subsequent PTT sessions will be initiated by the outside service 14.

After a possible lapse of time, in step 102 the user either selects the outside service 14 (created in step 100) from the contact list on the user's UE 16, or in step 104 the user sets up a future call through a out-of-bound mechanism directly with the outside service 14. Once SCS 14 receives the Subscribe message, in step 106 SCS 12 communicates with the outside service 14 so that outside service 14 is ready for the PTT session. The communication may include an exchange of metadata and media. Then after another possible lapse in time, in step 108, when either the outside service 14 or UE 16 (depending on the type of outside service 14) is ready to initiate a PTT session, an Invite message is sent from SCS 12 to the PoC System 18. Regardless of the type of outside service 14, there is some event that triggers the request to initiate the PTT session. For example, such an event might be the time for a wake-up call to occur or when the user wants to retrieve a traffic update. In response, in step 112 the PoC system 18 creates a PTT session between the outside service 14 and the user's UE 16.

FIG. 1 illustrates the concept that the user can sign up for the outside service at any time before a PTT session between the user and the outside service is created. There can also be a time lapse between when the call request is made and when the actual call session is established. This is the case when a user sets up a meeting reminder or wake-up call to happen sometime in the future.

B. Architecture

Figure 2:
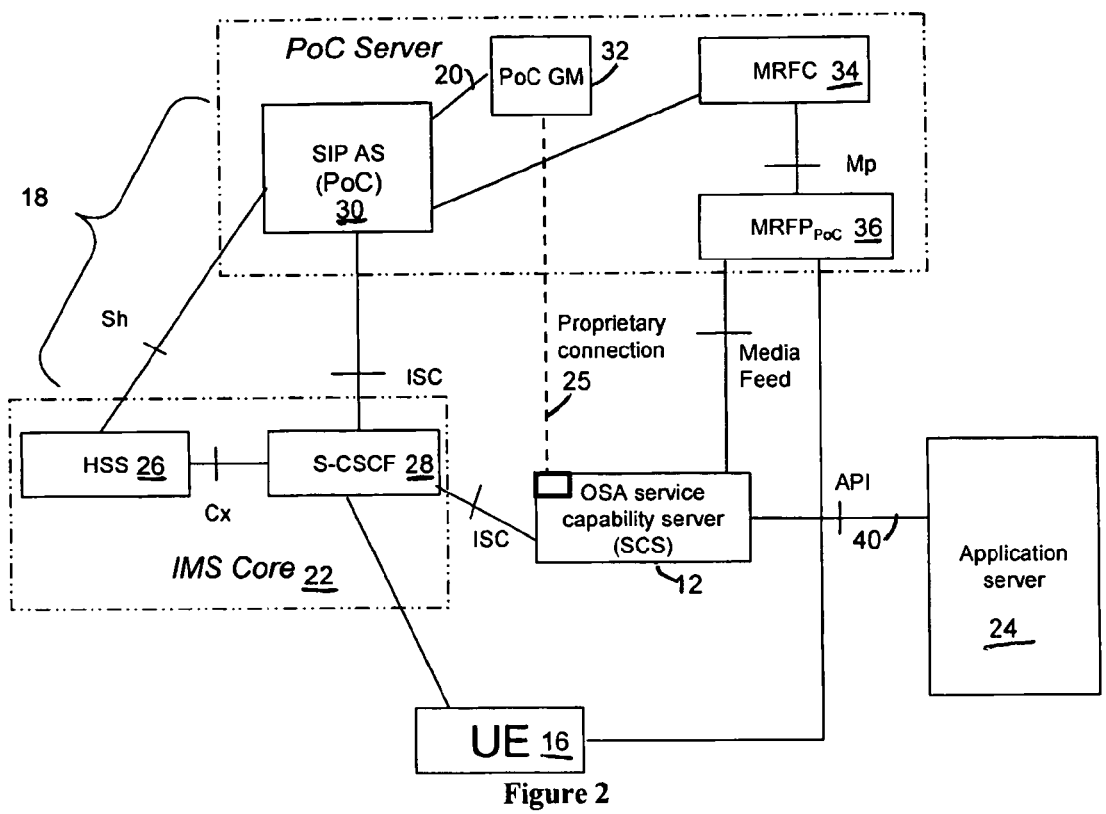
FIG. 2 is a block diagram of the various server entities in the system architecture of the preferred embodiment of the invention involved in creating PTT sessions between a user and an outside service.

FIG. 2 depicts the architecture of system 10, its components, and the various types of messaging interfaces between the system components. The basic components include SCS 12, UE 16, PoC system 18, and outside service application server 24 associated with outside service 14. The PoC system 18 includes PoC server 20 and IMS core 22, which is connected to outside services application server 24 through the SCS 12. The SCS 12 may communicate with the PoC server 12 via either a direct proprietary connection 25 or a standard ISC interface though IMS Core 22.

For each outside service 14, there is a corresponding outside service application server 24, which interfaces with the SCS 12 and the PoC server 20. Application program interface (API) 40 is provided to allow communication between the SCS 12 and the outside service application server 24. SCS 12 includes standard and application specific API's 40 to allow communication with a wide range of outside service application servers 24. One type of application server 24 is based upon the OSA standard. The use of the OSA standard enables the application server 24 to more easily connect with the PoC server 18. While the SCS 12 is able to communicate with OSA based application servers 24 via the OSA API, the SCS 12 may be configured to communicate with other application servers 20 as well, such as a Microsoft Outlook server.

The IMS Core 22 consists of the Serving Call Session Control Function (S-CSCF) 26 and the Home Subscriber Server (HSS) 28. The HSS 28 is a master database for the carrier's cellular network, which holds variables and identities for the support, establishment and maintenance of calls and sessions made by subscribers. The S-CSCF 26 regulates the call session by sending and receiving SIP messages to and from the PoC Server 20. The UE 16 accesses the IMS Core 22 for purposes of SIP signaling to the PoC Server 20.

The PoC Server 20 contains the SIP application server (SIP AS) 30, the PoC group management server (PoC GM) 32, the Media Resource Function Controller (MRFC) 34, and the Media Resource Function Processor (MRFP) 36. The SIP AS 30 manages SIP messaging for PoC Server 20. The PoC GM 32 provides a centralized contact list (i.e., address book) for outside service application serves 24 to which the UE 16 has signed-up. The Media Resource Function elements (MRC 34 and MRFP 36) control the media streams 38 involved in the call session. In the case of a PTT session involving an outside service 14, the outside service application server 24 sends the media stream either directly to the MRFP 36 once the PTT session is established or by the SCS 12 as shown in FIG. 2. This media stream 38 from the outside service 14 could contain data such as traffic reports, a text message meeting reminder, a prerecorded voice message, and the like.

C. Process

Figure 3:
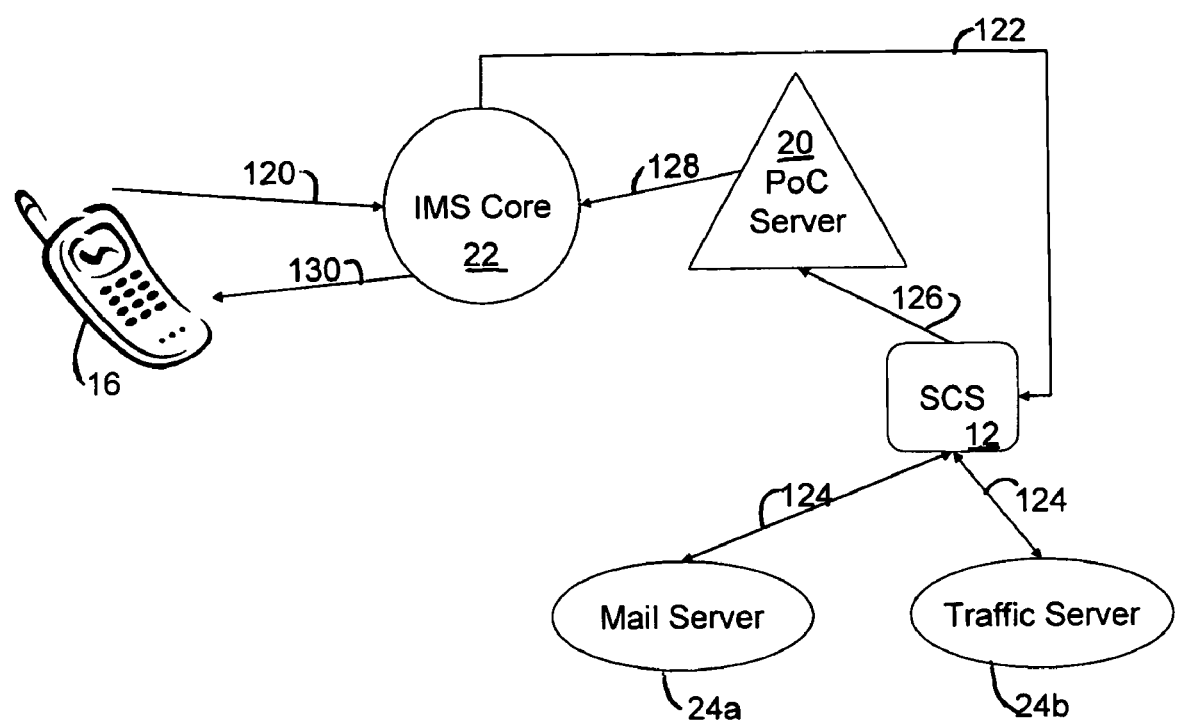
FIG. 3 is a combination block diagram and flow chart illustrating the service initiation flow in the preferred embodiment of the invention of a PTT session between a user and an outside web service such as a traffic report server or mail server.

FIG. 3 depicts the initiation of a PTT session between the UE and an outside service.

Step 120: The UE 16 sends a message to the IMS Core 22 to engage the outside service application server 24.

Step 122: The IMS Core 22 passes this message on to the SCS 12 (discussed in detail later in this specification).

Step 124: The SCS 12 engages with the outside service application server 24, signaling that information is being requested by the UE 16. The outside service application server 24 will respond by sending pre-fetched media such as a recorded voice message or a text message, or metadata— information such as when the call should come in, what content (radio station, MP3, etc.) should be played over the PTT session, and how long the session should last.

Step 126: The session may be scheduled to begin immediately or at some point in the future. When the session is schedule to begin, the SCS 12 sends a message to the PoC Server 20 via IMS Core 22. Although not shown in FIG. 3 for the sake of simplicity, the message is transmitted to the PoC Server 20 via IMS Core 22. This message contains information about the outside service 14 and alerts the PoC Server 20 to begin the PTT session between the outside service application server 24 and the UE 16.

Step 128: The PoC Server 20 initiates the PTT session.

Step 130: The IMS Core 22 relays the PTT session between the outside service application server 24 and the UE 16. The outside service application server 24 can be a mail server 24a, traffic server 24b or the like.

Figure 4:
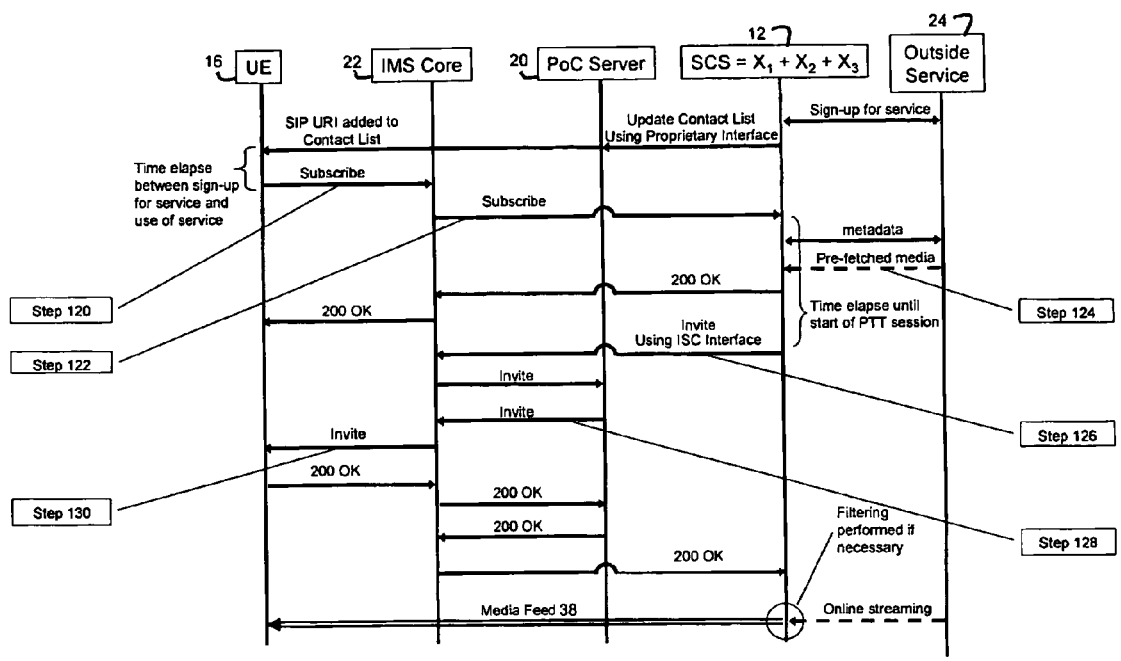
FIG. 4 is a data flow diagram depicting the UE initiated message flow of the preferred embodiment of the invention for the messages traveling back and forth among the various system entities when the user creates a PTT session.

This process may use SIP messages to create the PTT session between the UE 16 and the outside service application server 24. FIG. 4 shows the specific SIP messages that are involved in this process and the path the messages travel.

As shown in FIG. 4, initially, once the UE 16 signs-up with the outside service application server 24, the SCS 12 and outside service application server 24 communicate to allow the SCS 12 to update the contact list on the UE 16. First, SCS 12 updates the contact list managed by PoC GM 32 via the proprietary connection 25 so that the PoC Server 20 can add the SIP URI for outside service application server 24 to the contact list on UE 16.

Messages flow between the UE 16 and outside service application server 24 through the SCS 12 with a time delay before the PTT session is initiated. Regular SUBSCRIBE and 200 OK messages travel back and forth to alert the SCS 12 that the UE 16 is logging into the outside service 14 and seeking to establish a PTT session to receive information. When the SCS 12 receives the SUBSCRIBE message it communicates with the outside service application server 24 to get any extra information (i.e., metadata such as traffic route, meeting attendee names, etc.) it needs to properly create the PTT session and/or pre-fetched media. The SCS 12 waits until the time when the PTT session should begin and then sends an INVITE message to the IMS Core 22, which communicates with the PoC Server 20 to initiate the session to the UE 16. In the preferred embodiment, the UE 16 will be set to "auto answer" mode so that the UE 16 will automatically accept the PTT session. An optional repeat mechanism may be used to establish PTT sessions periodically by resending the INVITE message to the UE 16.

Figure 5:
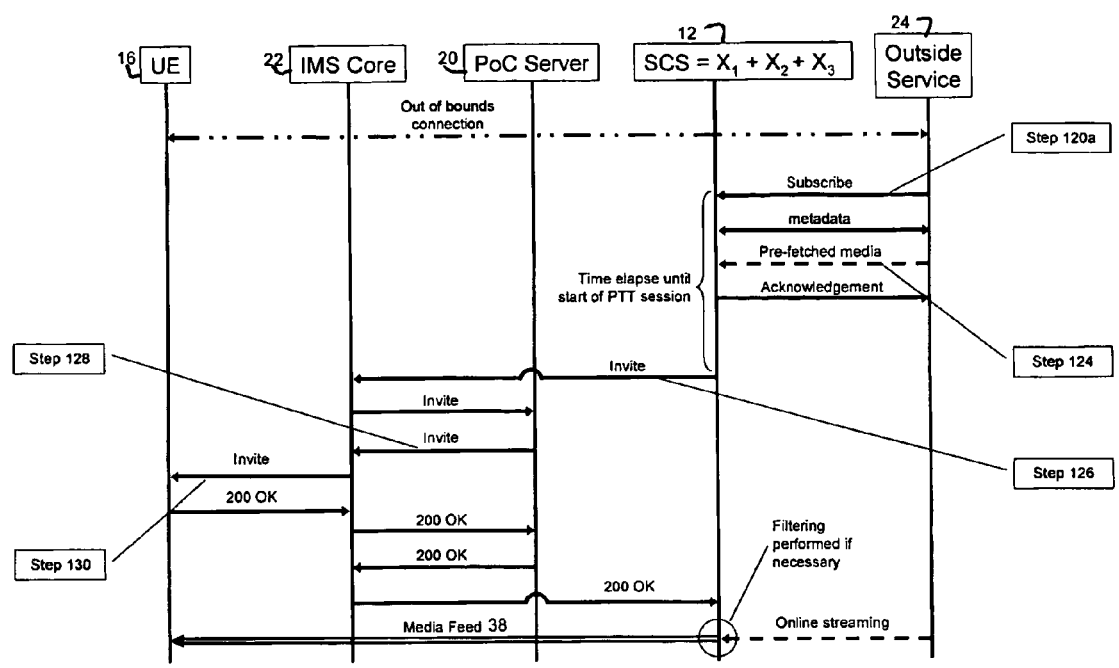
FIG. 5 is a data flow diagram depicting the externally initiated message flow of the preferred embodiment of the invention for the messages traveling back and forth among the various system entities when a PTT session is created by the outside service.

Media 38 from the outside service application server 24 then travels to the UE 16. This media 38 can either take the form of an online data stream or be a packet of data that was pre-fetched from the outside service application server 24 when the SUBSCRIBE message was received. This same sequence of events can happen when the outside service initiates the PTT session, as shown in FIG. 5. The step numbers in FIG. 4 refer to the sequence of events explained earlier in the context of FIG. 3.

As depicted in FIG. 5, the PTT session request is originating from an outside source such as a mail server. Like FIG. 4, the step numbers in FIG. 5 refer to the sequence of events explained earlier in the context of FIG. 3, except that the SUBSCRIBE message is triggered by an out-of-bounds procedure (for example, PC access to the outside service application server 24). Rather than the SUBSCRIBE message being initiated by the UE 16 and then traveling from the UE 16 to the IMS core 22 (step 120) and then to the SCS 12 (step 122) as shown in FIGS. 3 and 4, the SUBSCRIBE message is initiated by the outside application server 24 and travels to the SCS 12 in a single step (120a). Once the session request (SUBSCRIBE message) is received by the SCS 12, the message flows follow the same path as with a UE-initiated PTT session as shown in FIG. 4.

Figure 6:
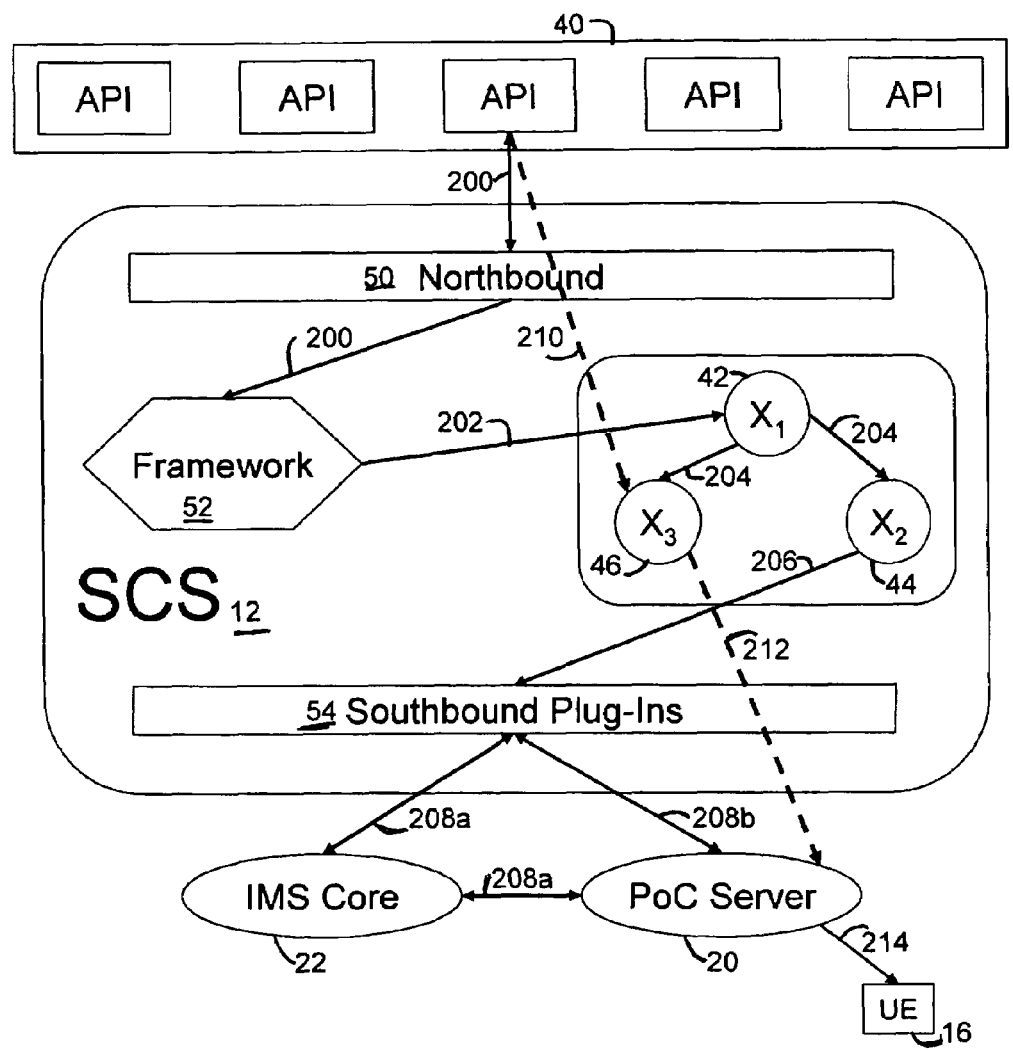
FIG. 6 is a combination block diagram and flow chart illustrating the SCS process flow of the preferred embodiment of the invention by which the outside service communicates with the various parts of the SCS and how the SCS then passes the messages through to the IMS Core and PoC Server.

As depicted in FIG. 6, the SCS 12 includes Subscription Engine ($X_1$) 42, PoC Service Initiator ($X_2$) 44, and Media Gateway ($X_3$) 46. Collectively, the subscription engine 42, PoC service initiator 44 and media gateway 46 form the sub-functions 48 of SCS 12. The Subscription Engine 42 is the part of the SCS 12 that communicates directly with the group/list manager (GM) of the outside service 14. The Subscription Engine 42 logs the user into the outside service 14 and collects the metadata associated with the user for use in establishing the PTT session between the UE 16 of the user and the outside service 14. The PoC Service Initiator 44 is the part of the SCS 12 that communicates with the IMS Core 22 and the PoC Server 20 to initiate the PTT session between the user and the outside service 14. The Media Gateway 46 is the part of the SCS 12 that moves media from the outside service 14 to the PoC Server 20. The process flow of the SCS 22, as depicted in FIG. 6, is described step-by-step below.

Step 200: The API 40 of the outside service application server 24 communicates with the SCS 12 through the northbound communications path 50. This communication goes to the SCS Framework 52 for routing to the appropriate sub-function 48 in the SCS 12. This communication can also originate from the user as shown in previous figures. In either case, the message path follows this process flow.

Step 202: The Subscription Engine 42 receives message from the Framework 52.

Step 204: The call session may be scheduled to start immediately or at some point in the future. When the PTT session is scheduled to begin, the Subscription Engine 42 communicates with the PoC Service Initiator 44, relaying the fact that a PTT session needs to be established between the user and the outside service 14. This session request can originate from the outside service application server 24 or from the UE 16. Both versions of the scenario will follow these steps. At this time, the Subscription Engine 42 also alerts the Media Gateway 46 to be ready to accept a media stream 48.

Step 206: The command to create the PTT session travels from the PoC Service Initiator 44 down through the Southbound Plug-Ins 54.

Step 208a or 208b: Depending on the interface being utilized the command will either travel to the IMS Core 22 before reaching the PoC Server 20 (Step 208a) or travel directly to the PoC Server 20 (step 208b). Systems that follow the SIP-based standard will utilize the IMS Core 22 as the intermediary between the southbound plug-ins 54 and the PoC Server 20 (Step 208a). Those systems following a proprietary standard might bypass the IMS Core 22 and receive the command directly in the PoC Server 20 (Step 208b).

Steps 210, 212 and 214: The outside service application server 24 sends the media stream 38 down through the Media Gateway 46 (step 210), which then sends the media stream 38 to the PoC Server 20 (step 212), which then sends the media stream 38 out to the UE 16 (step 214).

Figure 7:
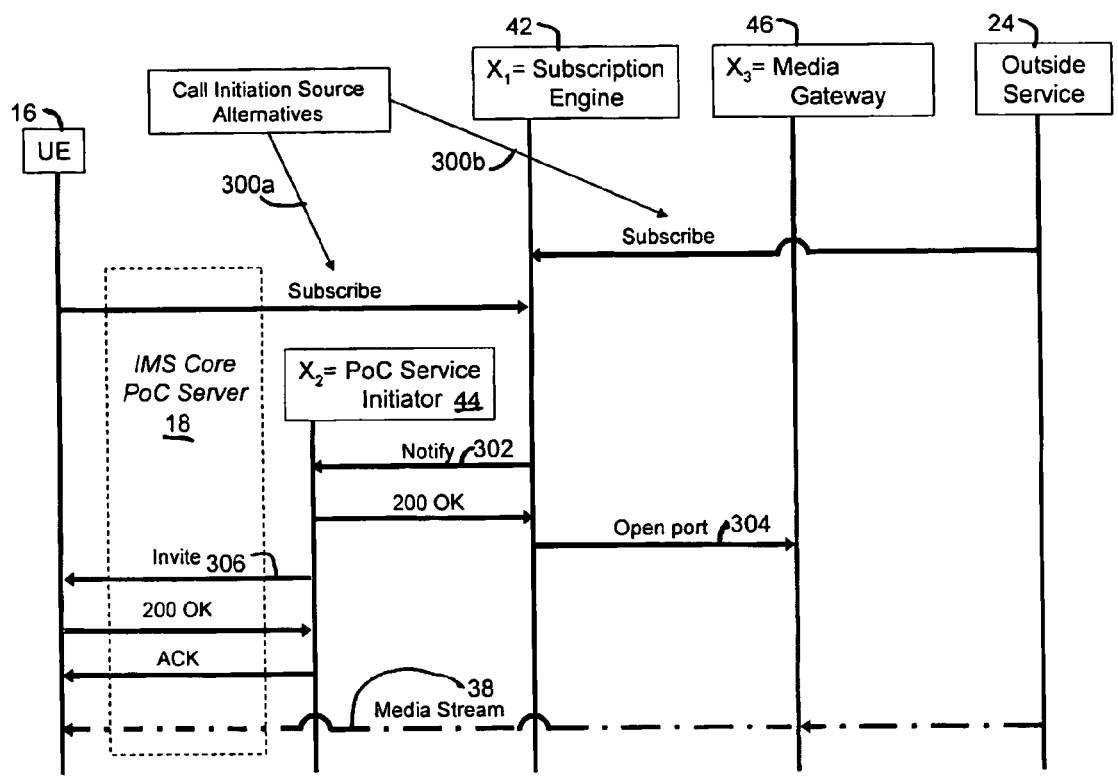
FIG. 7 is a data flow diagram depicting message flow inside the SCS of the preferred embodiment of the invention for the messages traveling between the various parts of the Service Capability Server (SCS) during a PTT session between a user and an outside service.

As shown above, the SCS 12 is made up of three sub-functions 48—the Subscription Engine 42, the PoC Service Initiator 44, and the Media Gateway 46. SIP messages travel between the Subscription Engine 42 and the PoC Service Initiator 44 before exiting and traveling back to the UE 16 through the IMS Core 22 and PoC Server 20. The Media Gateway 46 communicates with the Subscription Engine 42 to get the parameters it needs to correctly handle the incoming media 38 from the outside service application server 24. FIG. 7 illustrates these internal messages.

In particular, FIG. 7 shows the details inside the SCS 12 within the context of the messages shown in FIG. 3. The Subscription Engine 42 receives the SUBSCRIBE message from the UE 16 (by way of the IMS Core 22 and PoC Server 20, collectively the PoC System 18) (step 300*a*) or alternatively from outside service application server 24 (step 300*b*). Then the Subscription Engine 42 sends a NOTIFY message to the PoC Service Initiator 44 alerting it that the user is logged into the outside service 14 (step 302). Then, in response to a 200 OK message from the PoC Service Initiator 44, the Subscription Engine 42 alerts the Media Gateway 46 to open a data port (step 304). Additionally, the PoC Service Initiator 44 sends an INVITE message out to the UE 16 (through the IMS Core 22 and the PoC Server 20) to establish the PTT session (step 306). When the PTT session starts, the data feed 38 travels from the outside service 14 to the Media Gateway 46 and then through the IMS Core/PoC Server to the UE 16 (step 308).

Figure 8:
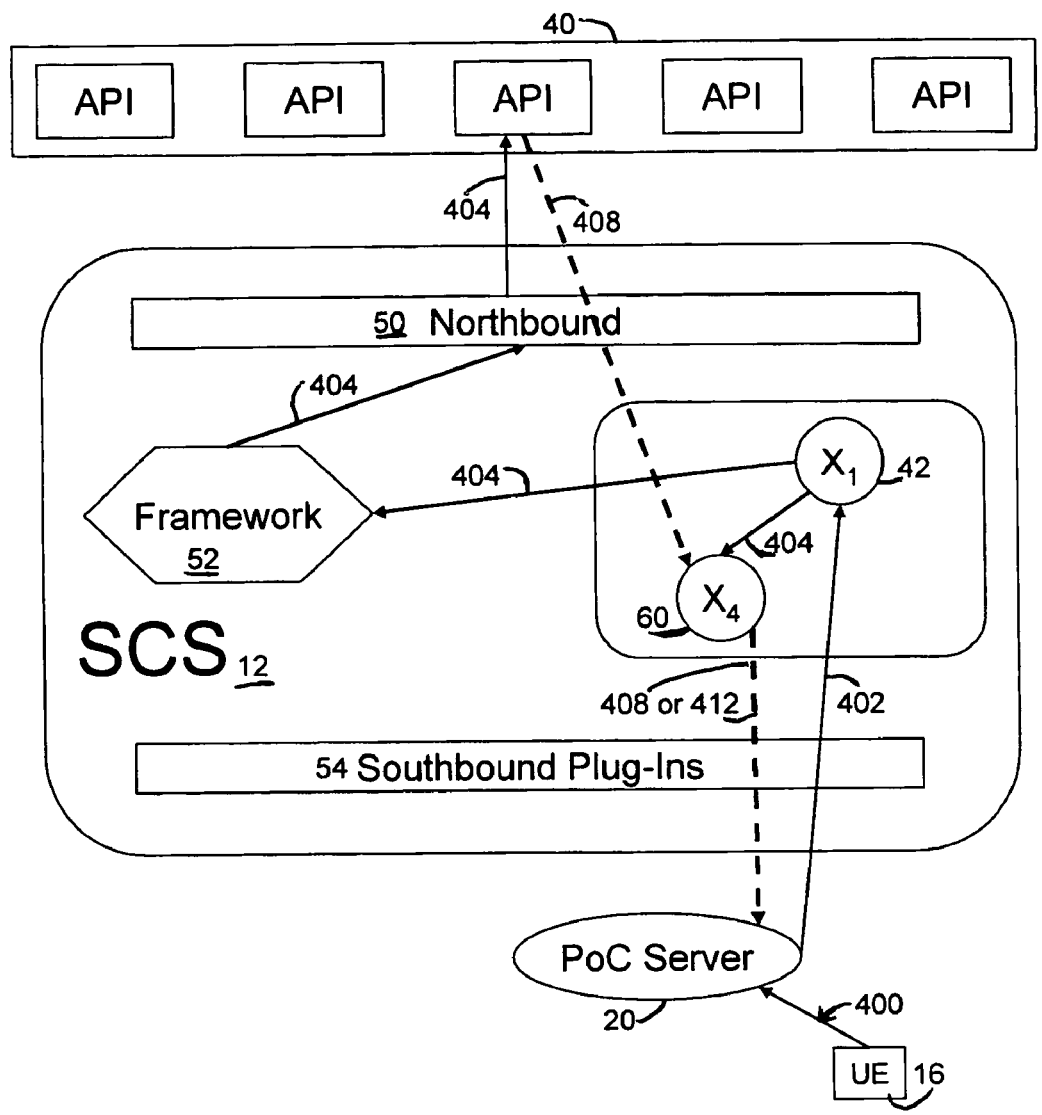
FIG. 8 is a combination block diagram and flow chart illustrating the SCS process flow of an alternate embodiment of the invention for the creation of and subscription to a list document instead of a PTT session.
Figure 9:
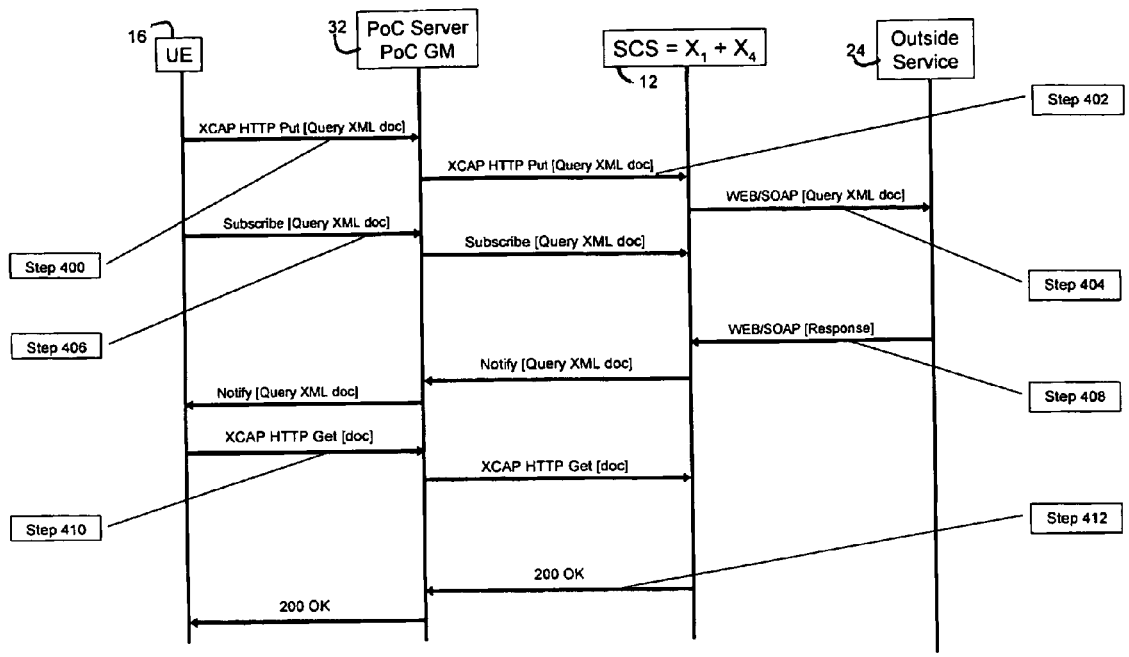
FIG. 9 is a data flow diagram depicting the message flow of the alternate embodiment of the invention shown in FIG. 8.

The connection between the PoC System 18 and an outside service 14 can also be used to initiate the creation of and subscription to a list document instead of a PTT session. For instances, a user can establish an account at a service 14 such as an online dating site and receive a list of matches on UE 16 using the method described in this patent. The SCS 12 will utilize the Subscription Engine 42 and a fourth element, XCAP (XML Configuration Access Protocol) Gateway 60, which acts much like Media Gateway 46 by providing a communications link between outside service application server 24 and PoC Server 20. FIG. 8 shows the placement of XCAP Gateway 60 within the SCS 12. XCAP Gateway 60 connects directly with outside service application server 24 and PoC Server 20 to relay the list document back to UE 16. FIG. 9 diagrams the messages being transferred back and forth to retrieve a list document from outside service application server 24 by UE 16.

Step 400: UE 16 sends an XCAP HTTP PUT message to PoC GM 32 of PoC Server 20 with a query request for the list document. This query request contains the metadata that outside service application server 24 will use to generate a list document that matches the parameters of the query. PoC GM 32 can add to the metadata in case a user profile for the UE 16 is stored within the system. The document id for the query and the result documents is the same to allow for automatic delivery of the results using the SIP Notify mechanism as defined for XCAP document management.

Step 402: PoC GM 32 sends the XCAP message to the SCS 12. Within SCS 12, Subscription Engine 42 alerts XCAP Gateway 60 that data will be coming in from outside service application server 24.

Step 404: Subscription Engine 42 then converts the request into the appropriate interface for outside service 14 and sends the message to outside service application server 24. Examples of common protocols on this interface are HTTP WEB and SOAP (Simple Object Access Protocol). Outside service 14 runs the query.

Step 406: In the meantime, UE 16 sends a Subscribe message to PoC GM 32 to receive notifications on any updates on the document it created with its query in step 400. This message reaches SCS 12 via PoC Server 20.

Step 408: Outside service application server 24 generates the result of the query and sends it back to SCS 12. Then, SCS 12 transforms the results into a list document (to be more exact an updated version of the original query document created and subscribed to by UE 16). If the resulting list document is small enough in size, it can be sent to UE 16 as a SIP Notify.

Step 410: If the list document is too large to fit within the SIP message size limit, XCAP Gateway 60 merely sends a SIP Notify message alerting UE 16 that it must send an XCAP HTTP GET message to retrieve the updated list document through the XCAP interface.

Step 412: At reception of the XCAP HTTP GET message from UE 16, XCAP Gateway 60 responds with the updated list document in a 200 OK message.

In case UE 16 makes the Subscribe continuous, Steps 408-412 will repeat every time data is changed within outside service application server 24 related to the query from UE 16.

As previously described with respect to subscription to a PoC session, the subscription to a list document can also be done out of bound of the PoC System 18 (i.e. in a manner similar to that shown in FIG. 5). In this case PoC System 18 is merely used for the delivery of the resulting list document to UE 16.

D. CONCLUSION

Having disclosed exemplary embodiments and the best mode, modifications and variations may be made to the disclosed embodiments while remaining within the subject and spirit of the invention as defined by the following claims.

What is claimed is:

1. A method of establishing a push-to-talk (PTT) session between a user equipment that is part of a push-to-talk over cellular (PoC) system and an outside service comprising:
    subscribing to an outside service by the user equipment;
    for a user initiated request, sending a request to establish the PTT session with the outside service by the user equipment to a service capability server (SCS), the SCS configured to communicate with the outside service utilizing an application program interface, wherein the outside service is a non-PTT entity;
    for an outside service initiated request, sending a request to establish the PTT session with the user equipment by the outside service to the SCS the SCS further configured to communicate with the user equipment;
    sending an invitation to initiate the PTT session between the user equipment and the outside service by the SCS to the PoC system; and
    establishing the PTT session between the user equipment and the outside service by the PoC system.

2. The method of claim 1 further comprising:
    after the establishing the PTT session, sending a request to join the PTT session by the SCS to at least one additional user; and
    joining the at least one additional user equipment with the PTT session.

3. The method of claim 1 wherein the user equipment is configured to communicate with the PoC system over an internet multimedia subsystem (IMS) core, wherein the IMS core is configured to provide SIP signaling between the user equipment and the PoC system.

4. The method of claim 3 wherein the IMS core comprises:
    a service call session control function (S-CSCF) for regulating call session by sending and receiving a plurality of SIP messages to and from the PoC system;
    a home subscriber server (HSS) for providing a database corresponding to a carriers cellular network.

5. The method of claim 1 further comprising:
    after sending the request, sending pre-session data by the outside service to the SCS.

6. The method of claim 5 wherein the pre-session data includes pre-fetched media and metadata.

7. The method of claim 6 wherein the pre-fetched media includes at least one selected from the group consisting of: a recorded voice message, a pre-recorded voice message, a traffic report, a text message, a text message meeting reminder, a wake-up call, and an alarm sound wherein the alarm sound includes radio and MP3 audio.

8. The method of claim 6 wherein the metadata includes at least one selected from the group consisting of: meeting attendee names, scheduling information, content information, duration information, a session condition, content format for media, traffic routes, and location information.

9. The method of claim 8 further comprising:
after sending the pre-session data, readying the invitation in accordance with the metadata.

10. The method of claim 1 wherein the outside services are selected from the group consisting of: a mail server, a traffic server, a MICROSOFT OUTLOOK™ server.

11. The method of claim 1 wherein the SCS includes:
a subscription engine for subscribing the user equipment with the outside service;
a PoC service initiator for initiating a PTT session on the PoC system; and
an application program interface (API) for providing communication between the SCS and an outside service application server that provides the outside service; and
a media gateway for moving media from the outside service application server to the user equipment.

12. The method of claim 11 wherein the media is selected from the group consisting of: a prerecorded voice message, a traffic report, a text message meeting reminder, an alarm sound, a radio station stream, an MP3 stream, an online data stream, and a wake-up call.

13. A method of establishing a user initiated push-to-talk (PTT) session between a user equipment that is part of a push-to-talk over cellular (PoC) system and an outside service comprising:
requesting the outside service by the user equipment to an outside service application server, wherein the outside service is a non-PTT entity;
sending a session initiation protocol uniform resource indicator (SIP URI) by a service capability server (SCS) to the user equipment in response to the requesting, wherein the SIP URI is mapped to an identifier utilized by the outside service, wherein the SCS utilizes an application program interface to communicate with the outside service;
sending a subscription message to indicate readiness to utilize the outside service by the user equipment to the SCS;
sending pre-session data to the SCS by the outside service in response to the SUBSCRIBE message;
sending an invitation message by the SCS to the PoC system in accordance with the pre-session data; and
establishing the PTT session between the user equipment and the outside service by the PoC system.

14. The method of claim 13 further comprising:
after the establishing the PTT session, sending a request to join the PTT session by the SCS to at least one additional user; and
joining the at least one additional user equipment with the PTT session.

15. The method of claim 13 wherein the subscription message is an SIP SUBSCRIBE message and the invitation message is an SIP INVITE message.

16. The method of claim 13 wherein the pre-session data includes pre-fetched media and metadata.

17. The method of claim 15 wherein the pre-fetched media includes at least one selected from the group consisting of: a recorded voice message, a pre-recorded voice message, a traffic report, a text message, a text message meeting reminder, a wake-up call, and an alarm sound wherein the alarm sound includes radio and MP3 audio.

18. The method of claim 15 wherein the metadata includes at least one selected from the group consisting of: meeting attendee names, scheduling information, content information, duration information, a session condition, content format for media, traffic routes, and location information.

19. The method of claim 13 wherein the outside services are selected from the group consisting of: a mail server, a traffic server, a MICROSOFT OUTLOOK server.

20. The method of claim 13 wherein the SCS includes:
a subscription engine for subscribing the user equipment with the outside service;
a PoC service initiator for initiating a PTT session on the PoC system;
an application program interface (API) for providing communication between the SCS and an outside service application server that provides the outside service; and
a media gateway for moving media from the outside service application server to the user equipment.

21. The method of claim 20 wherein the media is selected from the group consisting of: a prerecorded voice message, a traffic report, a text message meeting reminder, an alarm sound, a radio station stream, an MP3 stream, an online data stream, and a wake-up call.

22. The method of claim 21 wherein the subscription message is an SIP SUBSCRIBE message and the invitation message is an SIP INVITE message.

23. The method of claim 21 wherein the pre-session data includes pre-fetched media and metadata.

24. The method of claim 21 wherein the outside services are selected from the group consisting of: a mail server, a traffic server, a MICROSOFT OUTLOOK server.

25. The method of claim 21 wherein the SCS includes:
a subscription engine for subscribing the user equipment with the outside service;
a PoC service initiator for initiating a PTT session on the PoC system;
an application program interface (API) for providing communication between the SCS and an outside service application server that provides the outside service; and
a media gateway for moving media from the outside service application server to the user equipment.

26. The method of claim 25 wherein the media is selected from the group consisting of: a prerecorded voice message, a traffic report, a text message meeting reminder, an alarm sound, a radio station stream, an MP3 stream, an online data stream, and a wake-up call.

27. A method of establishing an outside service initiated push-to-talk (PTT) session between a user equipment that is part of a push-to-talk over cellular (PoC) system and an outside service comprising:
requesting the outside service by the user equipment to an outside service application server, wherein the outside service is a non-PTT entity;
sending a subscription message to indicate readiness to provide the outside service for the user equipment by the outside service to the SCS, wherein the SCS utilizes an application program interface to communicate with the outside service;
sending pre-session data to the SCS by the outside service;

sending an invitation message by the SCS to the PoC system in accordance with the pre-session data; and establishing the PTT session between the user equipment and the outside service by the PoC system.

28. The method of claim 27 further comprising:

after the establishing the PTT session, sending a request to join the PTT session by the SCS to at least one additional user; and joining the at least one additional user equipment with the PTT session.

29. The method of claim 27 wherein the pre-fetched media includes at least one selected from the group consisting of: a recorded voice message, a pre-recorded voice message, a traffic report, a text message, a text message meeting reminder, a wake-up call, and an alarm sound wherein the alarm sound includes radio and MP3 audio.

30. The method of claim 27 wherein the metadata includes at least one selected from the group consisting of: meeting attendee names, scheduling information, content information, duration information, a session condition, content format for media, traffic routes, and location information.

31. A service capability server (SCS) in communication with a push-to-talk network, the SCS configured to establish a push-to-talk (PTT) session with a user equipment, the SCS comprising:

means for subscribing the user equipment with an outside service application server; and means for initiating the PTT session on the PTT network, wherein in response to a message requesting to establish the PTT session at a predetermined time received by the means for subscribing, the means for subscribing makes a request to the means for initiating to initiate the PTT session, and wherein in response to the request, the means for initiating causes the PTT network to establish the PTT session.

32. The SCS of claim 31 further comprising:

means for sending a request to at least one additional user equipment to join the PTT session by the SCS after the PTT session is established; and means for joining the at least one additional user equipment with the PTT session.

33. The SCS of claim 31, further comprising:

a first communications channel for transmitting messages between the outside service application server and the SCS; and a second communications channel for transmitting messages between the PTT network and the SCS.

34. The SCS of claim 31, wherein the SCS communicates with the outside service application server via an application program interface (API).

35. The SCS of claim 31, wherein the PTT communications network is a cellular network.

36. The SCS of claim 35, wherein SIP is used as a signaling protocol and RTP is used as a data transmissions protocol; and wherein the means for subscribing is configured to receive a SUBSCRIBE message.

37. The SCS of claim 31, wherein the means for initiating is configured to cause the PTT network to establish a PTT session by generating an INVITE message.

38. The SCS of claim 31, wherein the predetermined time is immediately upon receipt of the message received by the means for subscribing.

39. The SCS of claim 31, wherein the predetermined time is at a time subsequent to receipt of the message received by the means for subscribing.

40. The SCS of claim 31, wherein the message received by the means for subscribing originates from the user equipment.

41. The SCS of claim 31, wherein the message received by the means for subscribing originates from the outside service application server.

42. The SCS of claim 31, further comprising:

means for obtaining metadata from the outside service application server prior to initiating the PTT session pertaining to the PTT session.

* * * * *